Sept. 20, 1966 J. S. SENEY 3,273,380
APPARATUS FOR DETERMINING MASS PER UNIT LENGTH
Filed June 14, 1963 3 Sheets-Sheet 1
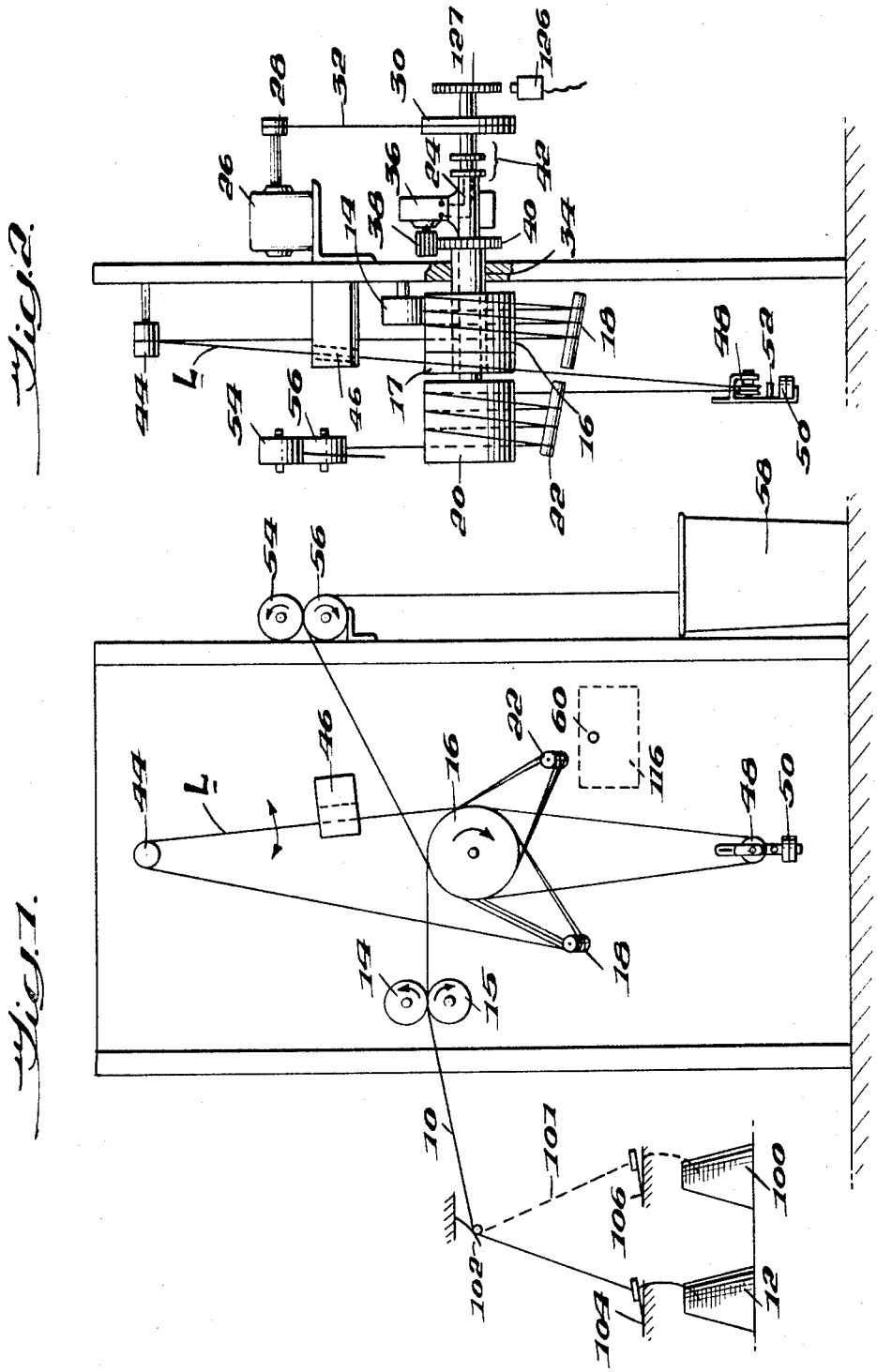

Sept. 20, 1966  J. S. SENEY  3,273,380
APPARATUS FOR DETERMINING MASS PER UNIT LENGTH
Filed June 14, 1963  3 Sheets-Sheet 2
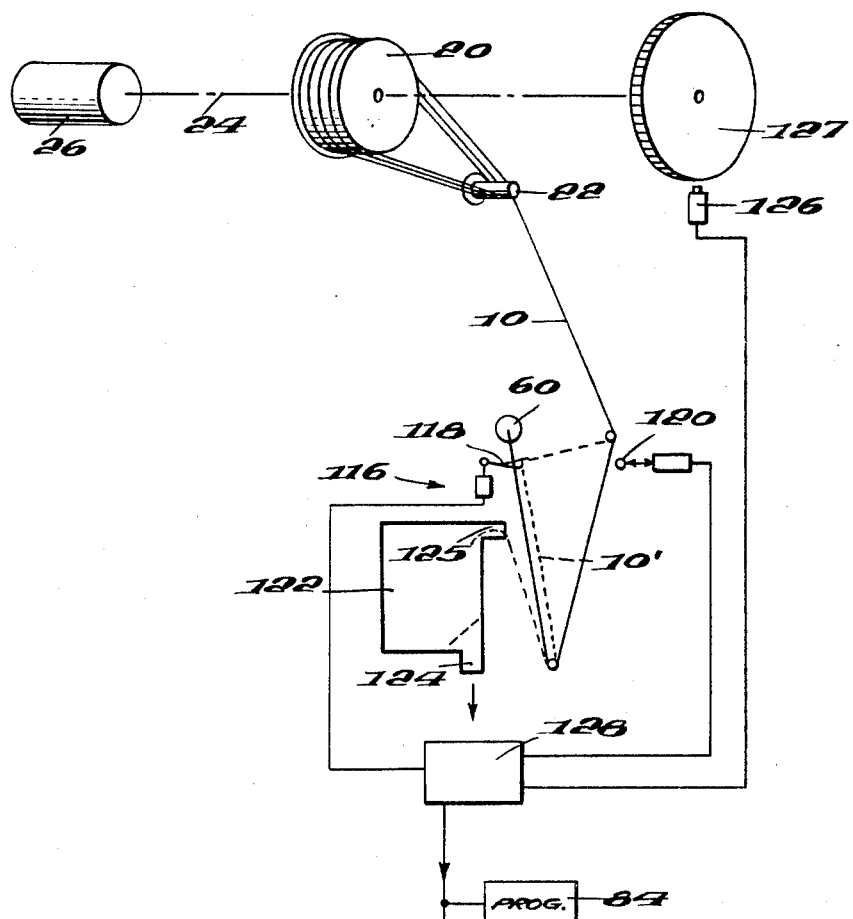
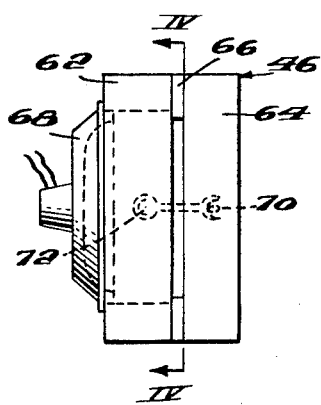
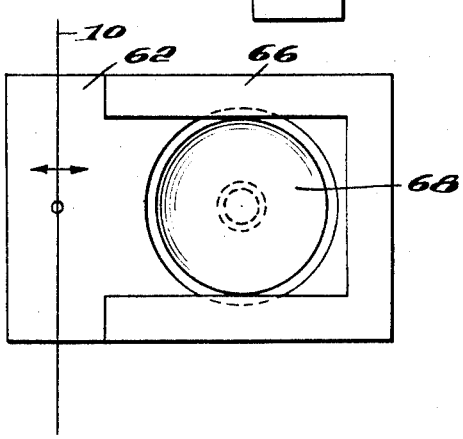

Sept. 20, 1966 J. S. SENEY 3,273,380
APPARATUS FOR DETERMINING MASS PER UNIT LENGTH
Filed June 14, 1963 3 Sheets-Sheet 3
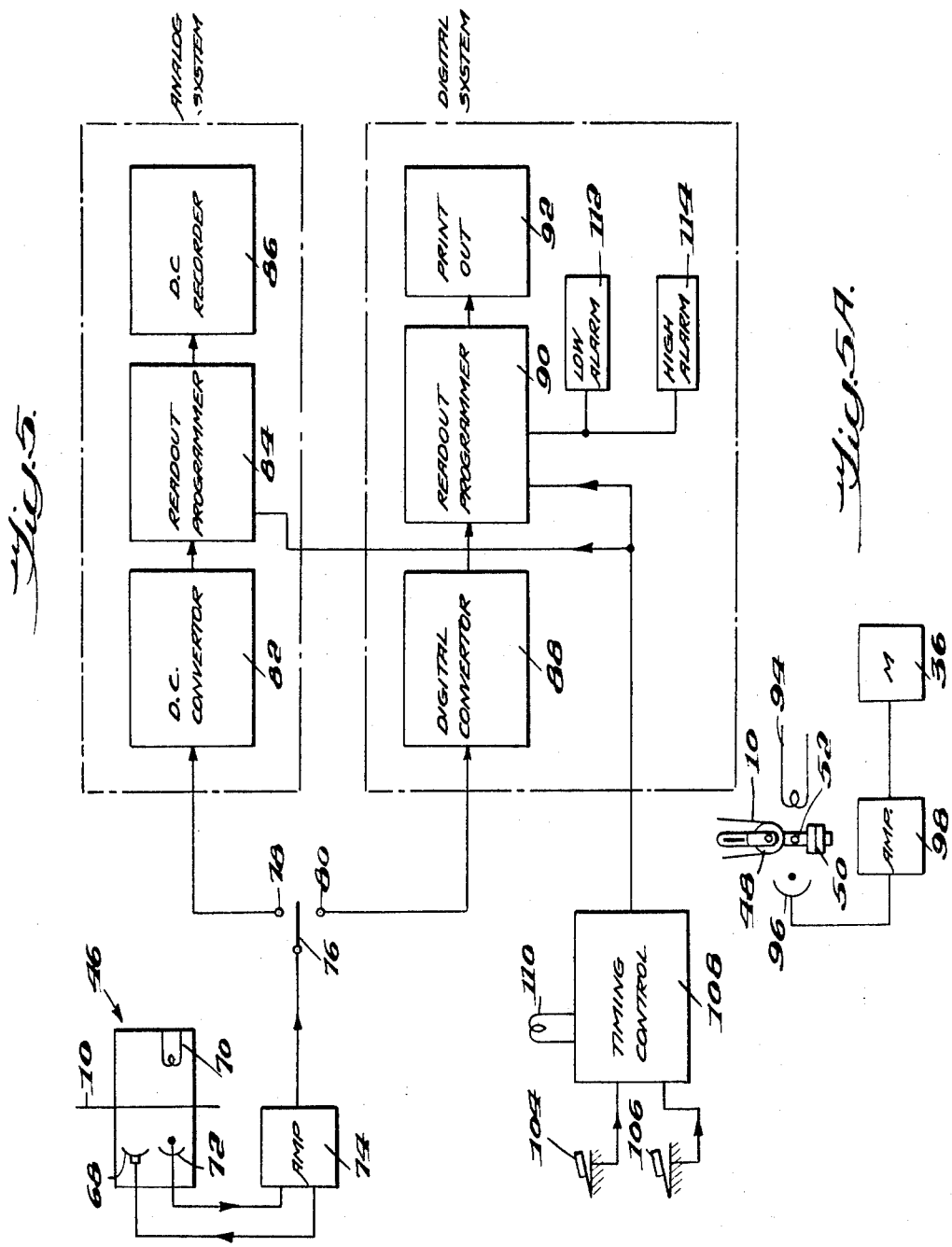

United States Patent Office 3,273,380
Patented Sept. 20, 1966

3,273,380
APPARATUS FOR DETERMINING MASS PER UNIT LENGTH
John S. Seney, Seaford, Del., assignor to E. I. du Pont de Nemours and Company, Wilmington, Del., a corporation of Delaware
Filed June 14, 1963, Ser. No. 287,815
3 Claims. (Cl. 73—67.2)

This invention relates to the determination of mass per unit length and, more particularly, to an apparatus useful in measuring and recording denier along a moving yarn.

For control or testing purpose, it is frequently desirable to determine the size of yarn, wire or similar elongated structures. In the case of continuous filament synthetic yarns, the size is commonly expressed in terms of denier, a mass per unit length measurement which has been defined as the weight in milligrams of nine meters of yarn. The usual method of measuring denier, by weighing the length of yarn in question, is not only tedious but also of questionable accuracy unless long lengths are measured.

An apparatus suitable for use in measuring the natural frequency of vibration of continuously advancing yarn and converting the frequency measurement to an indication of mass per unit length (denier) is described in my U.S. Patent No. 2,744,408. The mass indication is obtained from the expression $N = \frac{1}{2} L \sqrt{T/M}$ where N is the frequency of vibration of a length L of yarn which is under a constant tension T. The structural changes and modifications disclosed hereinafter have been adopted for purposes of simplification, accuracy, reliability and for the additional purpose of providing an apparatus with which successive bobbins or packages may be tested without the need for re-stringing the apparatus.

As indicated, it is an object of the present invention to provide an improved apparatus with which the mass per unit length of short increments of yarn, wire or the like can be determined quickly and with extreme accuracy. A more particular object is to provide improved means for maintaining tension in the test zone. An equally important object is to eliminate friction points in the vibrated yarn length. Yet another object is the provision of an improved sampling process. Still another object is to provide an improved read-out system for the deniering apparatus.

These and other objects are accomplished with a semi-automatic apparatus which includes, as essential elements, a driven shaft, an input feed roll rotatably mounted on the shaft, an output feed roll mounted on the shaft for rotation therewith, an idler roll spaced from the feed rolls, and a motor mounted on the shaft for rotation therewith and coupled to the input feed roll, the various rolls being positioned to advance a filamentary structure axially over the input feed roll, around the idler roll, in rolling contact with the input feed roll to the output feed roll. A tension weight is rotatably carried by the structure in a loop between the input and output feed rolls. There is a position detection means associated with said weight which includes components for forwarding a control signal to the motor whereby to maintain the position of said weight and therefore the amount of tension on the structure substantially constant in the length advancing from the idler roll to the input feed roll. In that length, a unit associated with the structure causes it to vibrate at its natural frequency, in a plane substantially perpendicular to the rotational axes of the feed rolls. The vibrator unit is coupled to circuitry for detecting that frequency, converting the detected frequency to an indication of mass per unit length and recording the mass indication.

In the following specification, such an apparatus is described with reference to the accompanying drawings wherein:

FIGURE 1 is a diagrammatic front elevation, showing the main elements of a preferred apparatus embodiment;
FIG. 2 is a corresponding side view;
FIG. 3 is a view of the yarn vibrator unit;
FIG. 4 is a section taken on line IV—IV of FIG. 3;
FIG. 5 is a block diagram of the major electronic components associated with the vibrator unit;
FIG. 5A is a diagrammatic view of components for correcting the position of the tension weight; and
FIG. 6 is a diagrammatic sketch of a sampling device.

Referring to FIGS. 1 and 2, a yarn threadline 10 is withdrawn from a package 12 by pre-tension rolls 14, 15. An input feed roll 16 and its associated separator roll 18 are mounted on shaft 24 in-board of an output feed roll 20 and its associated separator roll 22. Shaft 24 and roll 22 are driven as a unit by a motor 26 through pulleys 28, 30 and belt 32. Input feed roll 16 is mounted on a sleeve 34 which is rotatable on shaft 24. Motor 36 is also mounted on shaft 24 and, through pinion 38 and gear 40, rotates input feed roll 16 relative to output feed roll 20. The power to drive motor 36 is supplied through slip rings 42. Above the feed rolls 16, 20 is an idler roll 44. The vibrating unit 46 is located in the path of advance between idler roll 44 and feed roll 16. Below the feed rolls 16, 20 is a tension control roller 48 which supports weight 50 rotatably, in a loop of the yarn 10. Located on the frame connecting the tension control roller 48 and the weight 50 is a position pin 52. Idler roll 44 is positioned such that there is a rolling contact with only a slight angle of wrap of yarn 10 around a low friction zone 17 on input feed roll 16 as the yarn moves from idler roll 44 to the tension control roller 48. To the right of feed rolls 16, 20 (FIG. 1), is a pair of output rolls 54, 56.

In operation, yarn 10 is withdrawn from bobbin 12, pre-tensioned by rolls 14, 15, and advanced to input rolls 16, 18, around which a number of wraps are taken to avoid slippage. Yarn 10 is then taken partially around separator roll 18, over idler roll 44, through vibrating unit 46, in rolling contact with low friction zone 17 on input feed roll 16, to the tension control roller 48. As can be seen, there is a fixed distance L between idler roll 44 and input feed roll 16. No matter what speed the yarn is advancing, this distance remains constant. After touching zone 17, yarn 10 goes to the tension control roller 48 and back to output feed roll 20 and its companion separator roll 22. The yarn then advances to a pair of output rolls 54, 56 and drops to waste container 58. As long as the weight 50 remains free, it will maintain constant tension T on the threadline in the vibrated length L between roll 44 and zone 17 on feed wheel 16.

The vibrating unit, as shown in FIGS. 3 and 4, combines, in a single unit, the device which causes the threadline to vibrate with the pickup device which measures the frequency of threadline oscillations. Structurally, unit 46 consists of two elongated side plates 62, 64 held apart by a thin U-shaped spacer 66 so as to form a small cavity between the two plates. A loud speaker 68 of the permanent magnet type is fitted in an opening in the side of plate 62 and, when proper electrical signals are applied to its coil, causes the air to vibrate in the small cavity. Movement of air back and forth in the cavity causes yarn 10 to vibrate in a plane substantially perpendicular to the rotational axes of rolls 16, 20. A light source 70 and a photocell pickup 72 detect the vibrations and through appropriate feed back circuitry apply the proper signal to loud speaker 68 to maintain continuously advancing yarn 10 in oscillation at its natural frequency. As shown in FIG. 5, the output of photocell 72 is fed into an amplifier 74 with appropriate feed back to the loud speaker 68. The output from amplifier 74 is also connected to a single pole two-position switch 76. By connecting switch 76 to contact 78, the output of the amplifier 74 is forwarded to a D.C. convertor 82 which changes the variable oscillations to a D.C. signal. A read-out programmer 84 schedules the time when this output signal from convertor 82 actually appears on a D.C. recorder 86.

If the operator desires, switch 76 may be connected to contact 80 which leads the output from amplifier 74 to a frequency-digital convertor 88. As with the analog system, the digital system has a programmer 90 which schedules the test interval. The output is printed as a digital number in the print-out unit 92.

In order to eliminate the effect of threadline tension on the frequency of yarn vibrations, it is essential that tension be maintained constant in the measuring zone. As disclosed in U.S. Patent No. 2,744,408, a weight is supported by the moving threadline. The tension will remain constant as long as the weight is supported solely by the threadline and does not contact anything else. To assure this, it is desirable to keep the weight in one location by detecting any movement and making appropriate corrections. As shown in FIG. 5A, the magnetic pickup in the position detection means of my patent disclosure has been replaced with a photoelectric pickup similar to that used in detecting threadline vibrations. A light 94 is directed across pin 52 to a photocell 96. The output of photocell 96 is fed to amplifier 98 which in turn energizes motor 36. As mentioned previously, motor 36 positions weight 50 by rotating roll 16 relative to output feed roll 20. When pin 52 is directly on center, at its proper location, amplifier 98 is so adjusted that no signal is fed to motor 36. However, if pin 52 should tend to drop, an appropriate signal would be fed to motor 36 to rotate and move feed roll 16 counterclockwise with respect to output feed roll 20, thus shortening up the loop to tension control roller 48 and bringing the pin back to its initial location. It should be noted that while this slight adjustment is taking place, feed rolls 16, 20 are both rotating at essentially the same speed. Similar corrections would be made in the event of upward pin movement.

In a production control laboratory, the time associated with stringing-up a deniering apparatus is an important factor. Consequently, means have been devised and included in the present apparatus to keep the machine running continuously and to tie in new packages in such a manner that the machine is essentially strung-up automatically. While only two supply packages are shown, any number of positions may be used to hold test samples. As illustrated in FIG. 1, next to supply package 12 is a second package 100. The threadline 10, as it passes from supply package 12 to yarn guide 102, passes through a cutter device 104. After testing yarn 10, the operator strings-up yarn 101 through an associated cutter device 106 and ties it to yarn 10 while the latter is still moving from package 12. At this point, two threadlines are moving through the instrument. The operator then strikes cutter 104 with his hand and cuts down the yarn 10 coming from supply package 12. Yarn 101 is feeding through the machine and, after an appropriate time interval determined by a delay device in the coupled programmer 84 or 90 (FIG. 5), is tested. While this test is being made on yarn 101, supply package 12 can be removed and replaced with a new package. As mentioned before, any number of supply positions can be provided.

In normal production control testing, a limited length of sample is tested from each bobbin. With a predetermined yarn speed through the instrument, a time control unit can assure that the proper length sample is taken. This is done automatically to reduce the burden on the operator and is done by a timing controller 108, as shown in FIG. 5. When the desired length of sample has been tested, the timing controller 108 indicates this by lighting the start light 110 to signal the operator that he can start the next sampling. He connects the new sample to the moving threadline, as described above, pushes the cutter 104 to cut off the old sample and start testing the new sample. The time delay is set so that the testing is not started on the second sample until all of the first sample has reached waste can 58. After this delay, the timing controller 108 directs a signal to the read-out programmer 90 (or to the read-out programmer 84 if an analog output is desired). For normal production control work, the digital system is preferred. The read-out programmer 90 it pre-set to measure the frequency for a specific time interval. A digital number will then be recorded in the print-out 92. At that time, the timing controller 108 indicates to the operator via the start light 110 that he may start the next sample. Alarms 112 and 114 may be set so that if the sample is outside preset limits, either too high or too low, the appropriate light will be flashed as an indication that the particular bobbin should be rejected.

An improved sampling assembly has been developed for use in checking the calibration of this instrument. The sampling assembly 116 is shown in box form in FIG. 1 and in more detail in FIG. 6. Yarn is passed to waste jet 60 (FIGS. 1 and 6) rather than to rolls 54, 56 when using this assembly. The sampling assembly consists of a cut-down device 118, a movable guide 120 and a sample collection chamber 122, which is connected to vacuum through opening 124, thus causing opening 125 to act as a sample jet. Operation of cut-down device 118 and movable guide 120 are sequenced by controller 128. As shown in FIGS. 2 and 6, a counter wheel 127, which can be a simple gear or toothed wheel, is mounted on shaft 24. A magnetic pickup 126 is located in close proximity to the counter wheel 127. The controller 128, by counting the number of pulses induced into the magnetic pickup 126 by the projections on wheel 127, can determine the number of revolutions of feed wheel 20 and thus the desired sample length.

Such a sampling cycle can be initiated by pushing the appropriate start button which starts the mass vibrometer determination of denier. A timing circuit in the controller 128 delays both the count and the actuation of cut-down device 118 until the measured length reaches device 118. This assures that the mass vibrometer denier determination is made on the section of yarn to be colletced. At the end of the time delay, the cut down 118 is actuated and the advancing yarn is picked up by jet 125 and collected in the sample chamber 122. After the yarn is cut, the movable guide 120 repositions the threadline in the cut-down device 118, as indicated at 10'. Controller 128 counts the number of pulses generated by the teeth of wheel 127 passing the magnetic pickup 126 and, when a number of pulses equal to the measured length of yarn has been counted, cut-down device 118 is again actuated. The yarn 10' is then picked up by the waste jet 60 and the movable guide 120 returns to its original position. The measured sample is removed from the sample chamber 122, weighed and the denier calculated. A comparison of this weighed sample with the output from the mass vibrometer enables the calibration of the mass vibrometer to be checked in a simple and expeditious manner. It is obvious that, if desired, an automatic weighing system could be installed and calibrated to read the denier directly and to thereby eliminate the manual sample-weighing and denier calculation. Also, this calibration device could be used independently in association with a denier reel to obtain improved accuracy over the denier reel method.

In some instances, it may be desirable to omit rolls 54, 56 (FIG. 1) and use waste jet 60 during both deniering and sampling cycles. Other changes and modifications of a similar nature may be made without depart-

Having thus described the invention, what is claimed as new and desired to be secured by Letters Patent is:

1. An apparatus for determining mass per unit length of a filamentary structure, said apparatus comprising: a driven shaft; an input feed roll rotatably mounted on said shaft; an output feed roll mounted on said shaft for rotation therewith; an idler roll mounted in spaced relationship to said shaft; a motor mounted on said shaft for rotation therewith and coupled to said input feed roll, said rolls being adapted to advance said structure axially over the input feed roll, around the idler roll, in rolling contact with the input feed roll to the output feed roll; a weight rotatably carried by the advancing structure in a loop between said input and output feed rolls; position detection means associated with said weight, said detection means including components for forwarding a control signal to said motor whereby to maintain the position of said weight and therefore the amount of tension on said structure substantially constant in the length advancing from said idler roll to the input roll; means associated with said structure in said length for vibrating the latter at its natural frequency, in a plane substantially perpendicular to the rotational axes of said feed rolls; and circuitry for detecting that frequency, converting the detected frequency to an indication of mass per unit length and recording the mass indication.

2. The apparatus of claim 1 wherein is provided a manually operable cutting means and a guide means through which said structure advances from its source, there being at least one additional cutting means through which a second structure advances after being coupled with the first structure, said circuitry including a timing component responsive to actuation of the cutting means associated with the first structure for initiating a determination of the mass per unit length of said second structure after the first structure has been cut.

3. The apparatus of claim 1 wherein said means for vibrating is a unitary device comprising: a pair of elongated plates; a U-shaped spacer between the plates adjacent one end thereof, defining a cavity, one of said plates having an opening therethrough; a speaker fitted in said opening and adapted to vibrate at the frequency of its input; and a photoelectric circuit including components in each plate adjacent the opposite end thereof, said length of the structure passing between said plates being in a position to interrupt the light beam of said photoelectric circuit when vibrating responsive to movement of air in said cavity, said circuitry including a component for feeding said detected frequency back to said speaker and thereby causing said structure to vibrate at its natural frequency in said length.

References Cited by the Examiner

UNITED STATES PATENTS

| 2,744,408 | 5/1956 | Seney | 73—67.2 |
| 3,183,711 | 5/1965 | Duncan | 73—160 |

References Cited by the Applicant

UNITED STATES PATENTS

| 2,538,444 | 1/1951 | De Mars. |
| 2,874,899 | 2/1959 | Roehrig. |

FOREIGN PATENTS

| 397,167 | 8/1933 | Great Britain. |
| 754,918 | 8/1956 | Great Britain. |

RICHARD C. QUEISSER, *Primary Examiner.*